US011200455B2

(12) United States Patent
Nagai et al.

(10) Patent No.: US 11,200,455 B2
(45) Date of Patent: Dec. 14, 2021

(54) GENERATING TRAINING DATA FOR OBJECT DETECTION (71) Applicant: International Business Machines Corporation, Armonk, NY (US)

(72) Inventors: Shingo Nagai, Tokyo (JP); Kohhei Nomura, Fujisawa (JP); Madoka Yamagami, Tokyo (JP); Yiru Lai, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 60 days.

(21) Appl. No.: 16/691,746

(22) Filed: Nov. 22, 2019

(65) Prior Publication Data
US 2021/0158089 A1 May 27, 2021

(51) Int. Cl.
G06K 9/62 (2006.01)
G06K 9/46 (2006.01)
G06K 9/44 (2006.01)

(52) U.S. Cl.
CPC ............. G06K 9/6256 (2013.01); G06K 9/44 (2013.01); G06K 9/4642 (2013.01); G06K 9/6261 (2013.01)

(58) Field of Classification Search
CPC ...... G06K 9/44; G06K 9/4642; G06K 9/6261; G06K 9/6256
See application file for complete search history.

(56) References Cited

U.S. PATENT DOCUMENTS

| 2008/0075367 | A1 | 3/2008 | Winn et al. |
| 2009/0092301 | A1 | 4/2009 | Jerebko et al. |
| 2018/0012110 | A1* | 1/2018 | Souche ............... G06F 16/50 |
| 2018/0307942 | A1 | 10/2018 | Pereira et al. |

(Continued)

FOREIGN PATENT DOCUMENTS

| CN | 109583321 A | 4/2019 |
| CN | 109697397 A | 4/2019 |

(Continued)

OTHER PUBLICATIONS

International Search Report and Written Opinion, International Application No. PCT/IB2020/060819, dated Feb. 25, 2021, 10 pages.

Primary Examiner — Myron Wyche
(74) Attorney, Agent, or Firm — Jeffrey M. Ingalls (57) ABSTRACT A method for generating training data for object detection is provided. The method includes dividing an image into a plurality of sliced images. The image includes meta information for an object in the image, the meta information including bounding box information associated with a bounding box surrounding the object, and marker information for markers associated with the object, the markers being located within the bounding box. The method includes designating at least one sliced object image from among the plurality of sliced images, at least a portion of the bounding box overlapping with each of the respective sliced object images. The method also includes designating at least one training data image from among the designated sliced object images based on the marker information. The method also includes generating the training data from the designated training data images.

20 Claims, 8 Drawing Sheets (56) References Cited

U.S. PATENT DOCUMENTS

2019/0050981 A1 2/2019 Song et al.
2019/0108420 A1 4/2019 Harary et al.

FOREIGN PATENT DOCUMENTS

| CN | 109766830 A | 5/2019 |
| CN | 110415238 A | 11/2019 |
| JP | 2010057528 A | 3/2010 |
| JP | 2018514024 A5 | 2/2019 |

* cited by examiner

GENERATING TRAINING DATA FOR OBJECT DETECTION

BACKGROUND

The present disclosure relates to methods, computer systems and computer program products for generating training data for object detection in images. The use of deep learning neural networks (DNNs) may allow for effective training for object detection. Annotation information for the images are included in the DNN training procedures.

SUMMARY

Embodiments of the present disclosure relate to a method for generating training data for object detection. In certain embodiments, the method includes dividing an image into a plurality of sliced images. The image includes meta information for an object in the image, the meta information including bounding box information associated with a bounding box surrounding the object, and marker information for markers associated with the object, the markers being located within the bounding box. The method includes designating at least one sliced object image from among the plurality of sliced images, at least a portion of the bounding box overlapping with each of the respective sliced object images. The method also includes designating at least one training data image from among the designated sliced object images based on the marker information. The method also includes generating the training data from the designated training data images.

Other embodiments of the present disclosure are directed to a computer system and computer program product for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

The embodiments described herein provide for methods, computer systems, and computer program products for generating training data for object detection in digital images, that reduce the amount of image annotation information that must be processed when performing the training. The flowcharts and cross-sectional diagrams in the Figures illustrate these methods according to various embodiments. In some alternative implementations, the steps in the flowcharts may occur in a different order that that which is noted in the Figures.

A digital image is a digital representation or facsimile of a physical object or a collection of physical objects. Technologies exist that can detect or recognize certain objects that are present in a given digital image. For example, software installed on a digital camera can recognize that objects, such as the human face or eyes, are present in an image captured by a sensor of the camera. Photo editing software applications can also recognize that objects, such as straight lines, are present in the digital image being edited. Neural networks and other deep learning modules can be utilized to aid in this object detection.

An Artificial Neural Network (ANN) (also referred to as a neural network) is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex, but on much smaller scales. A large ANN might have hundreds or thousands of processor units, whereas a mammalian brain has billions of neurons with a corresponding increase in magnitude of their overall interaction and emergent behavior. A feedforward neural network is an artificial neural network where connections between the units do not form a cycle.

A deep learning neural network (DNN) is an artificial neural network (ANN) with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

In machine learning, a convolutional neural network (CNN or ConvNet) is a type of feed-forward ANN in which the connectivity pattern between its nodes (neurons) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images. Thus, a CNN is a class of DNN that is commonly applied to analyzing visual imagery. In the field of computer vision, convolutional neural networks excel at image classification, which consists of categorizing images, given a set of classes, and having the network determine the strongest class present in the image.

In recent years, region-convolutional neural networks (R-CNNs) have been developed to deal with the tasks of object detection, localization and classification. In general, a R-CNN is a special type of CNN that is able to locate and detect objects in images. The output of the R-CNN is generally a set of bounding boxes that closely match each of the detected objects, as well as a class output for each detected object.

In recent years, new architectures were created to address certain processing bottlenecks associated with the R-CNN and its successors, enabling improvements in real-time object detection. Two examples of these new architectures are You Only Look Once (YOLO) and Single Shot Detector (SSD MultiBox). However, architectures for object detection such as YOLO and SSD have limitations when detecting certain smaller sized objects. With these architectures, it is difficult to detect very small objects in a high-resolution digital image. One solution to this problem is to slice the high-resolution image into many small images. This makes the target size large enough for the object detection models.

When the target is very small compared to the size of input image, it is necessary to slice the image into hundreds (or more) of smaller sliced images during preprocessing and for inference (e.g., the process of using a trained machine learning algorithm to make a prediction). Consequently, it is also required to slice the training data into hundreds of small images.

There is also a need to make annotations for each of the small images. In general, an annotation refers to the assigning of metadata (e.g., name of the image creator, keywords related to the image, captions, titles and comments, size of the image, location of the image, etc.) to an image. Creating annotations for very large amounts of sliced data results in a very heavy workload. One method for reducing the workload is to automatically create new annotations for the small images from the original annotations. However, this method results in annotations in areas where no target objects are included, which can reduce the accuracy of the deep learning model.

Figure 1:
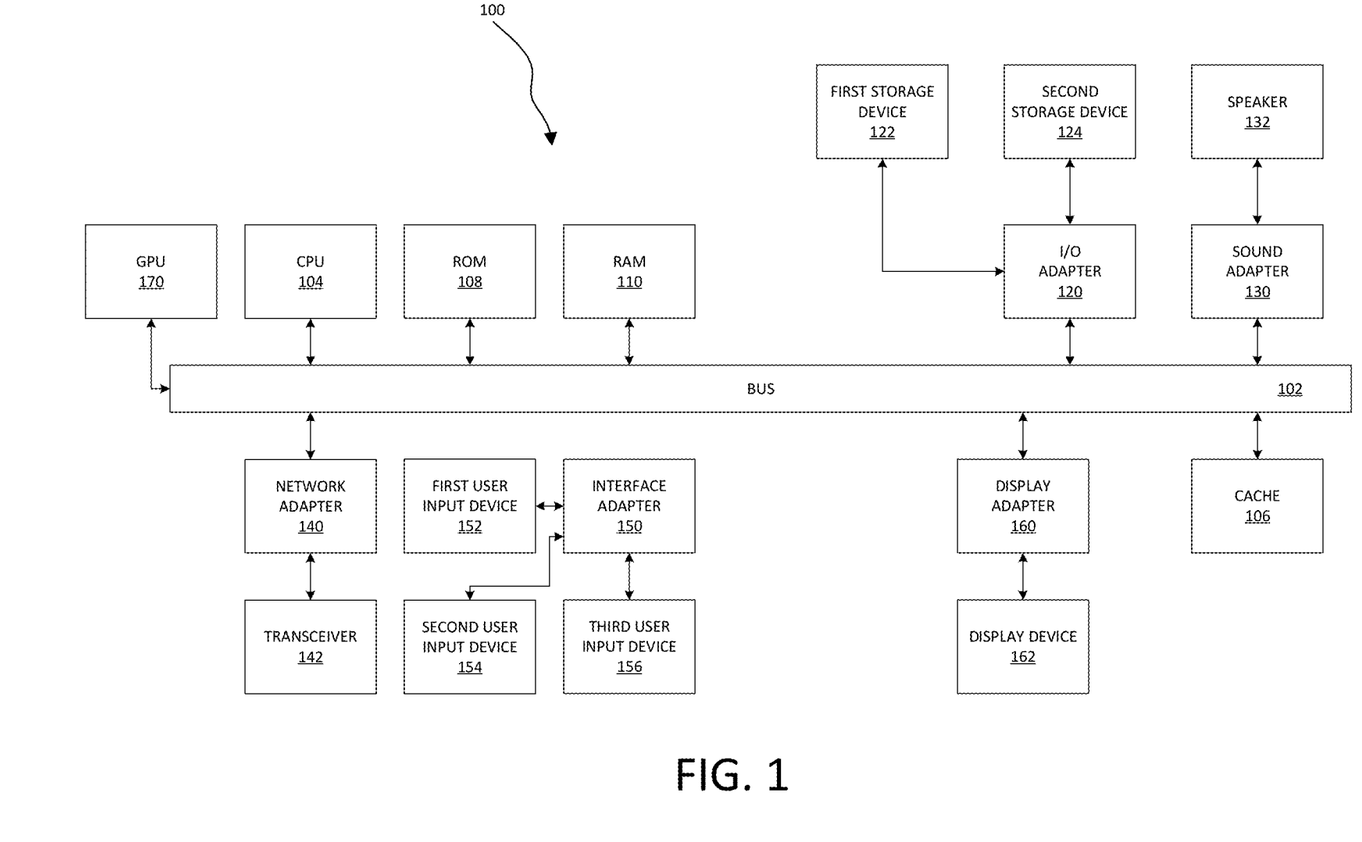
FIG. 1 depicts a block diagram of a processing system, according to embodiments.

Referring now to the drawings in which like numerals represent the same or similar elements and initially to FIG. 1, an exemplary processing system 100 to which the present embodiments may be applied is shown in accordance with one embodiment. The processing system 100 includes at least one processor (CPU) 104 operatively coupled to other components via a system bus 102. In certain embodiments, the CPU executes pre-processing of an image with a labeling tool, the labeling tool enabling a user to create a bounding box for an object in the image, and to create markers for the object within the bounding box. In certain embodiments, the CPU executes pre-processing of the image with a slicing tool that divides the image into a plurality of smaller images based on a size of a detection target object. A cache 106, a Read Only Memory (ROM) 108, a Random-Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 may be any of a disk storage device (e.g., a magnetic or optical disk storage device), a solid-state magnetic device, and so forth. The storage devices 122 and 124 may be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 may be any of a keyboard, a mouse, a keypad, an image capture device, a motion sensing device, a microphone, a device incorporating the functionality of at least two of the preceding devices, or any other suitable types of input devices. The user input devices 152, 154, and 156 may be the same type of user input device or different types of user input devices. The user input devices 152, 154, and 156 are used to input and output information to and from system 100. In certain embodiments, a graphics processing unit (GPU) 170 is operatively coupled to system bus 102. In these embodiments, the GPU performs training and inference on the image with a deep learning object detection model.

The processing system 100 may also include other elements (not shown), as readily contemplated by one of skill in the art, as well as omit certain elements. For example, various other input devices and/or output devices may be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present disclosure provided herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure that includes a network of interconnected nodes.

Figure 2:
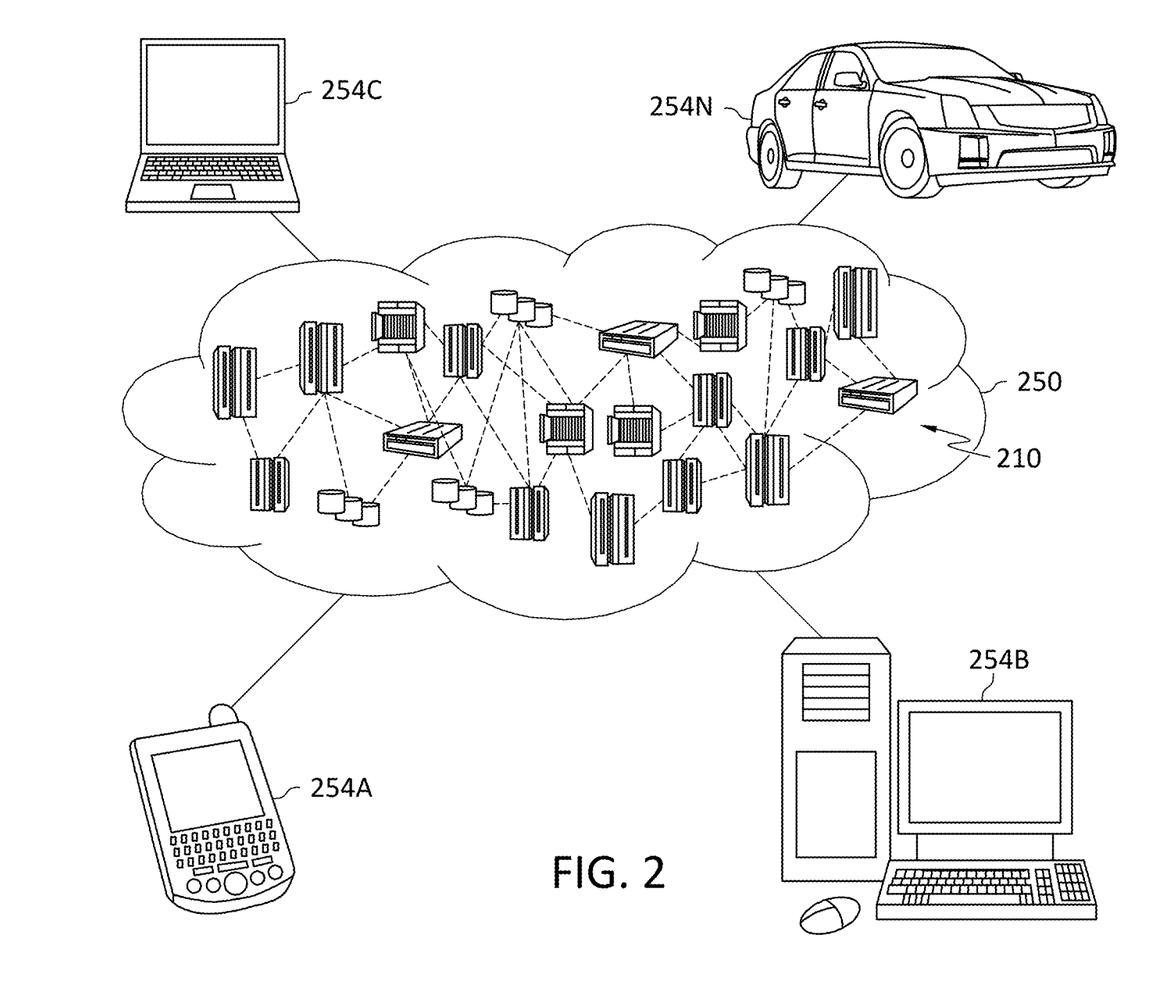
FIG. 2 is a block diagram of an illustrative cloud computing environment having one or more computing nodes with which local computing devices used by cloud customers to communicate, according to embodiments.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
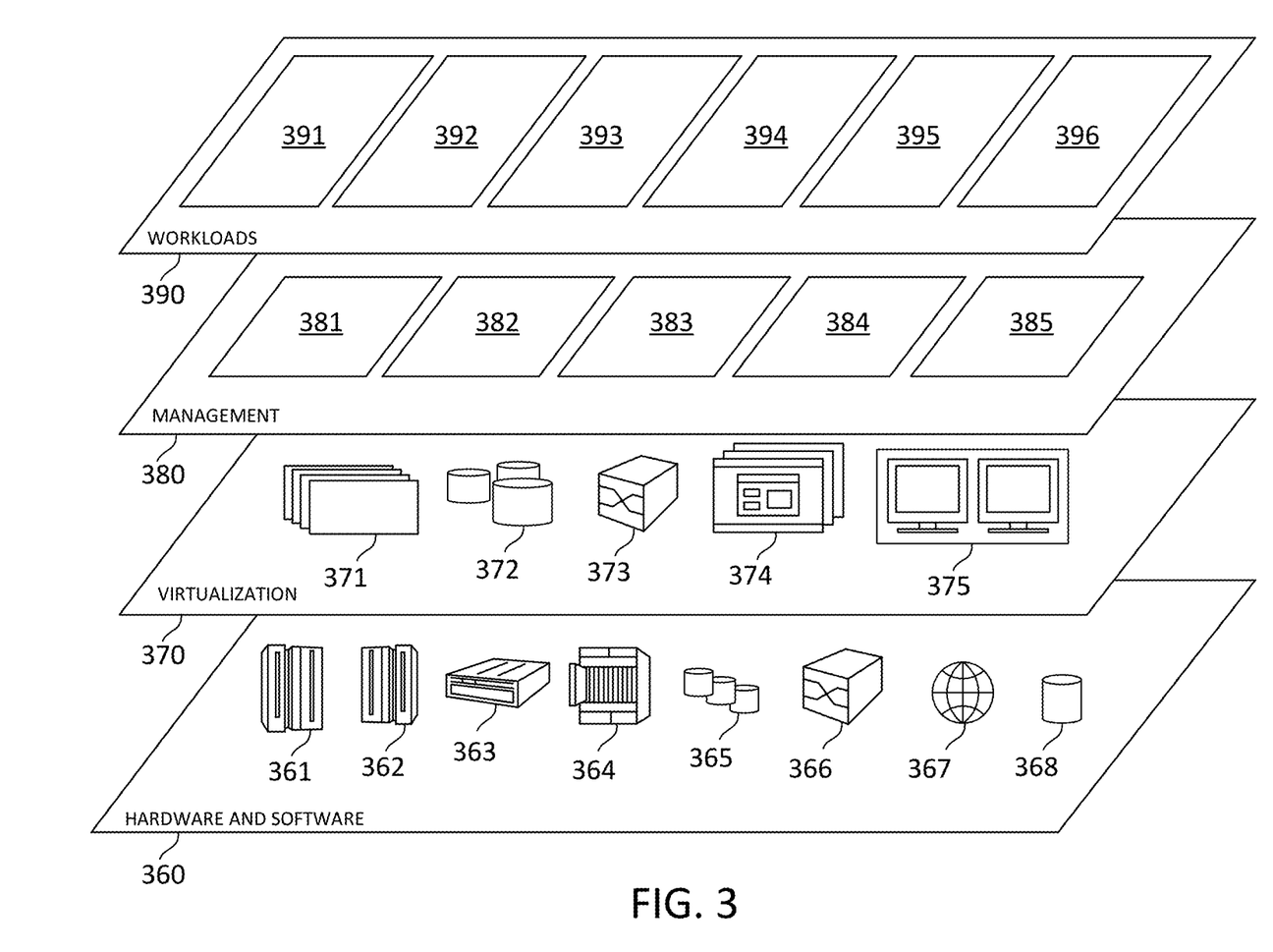
FIG. 3 is a block diagram of a set of functional abstraction layers provided by a cloud computing environment, according to embodiments.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture-based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and object detection training processing 396.

Figure 4:
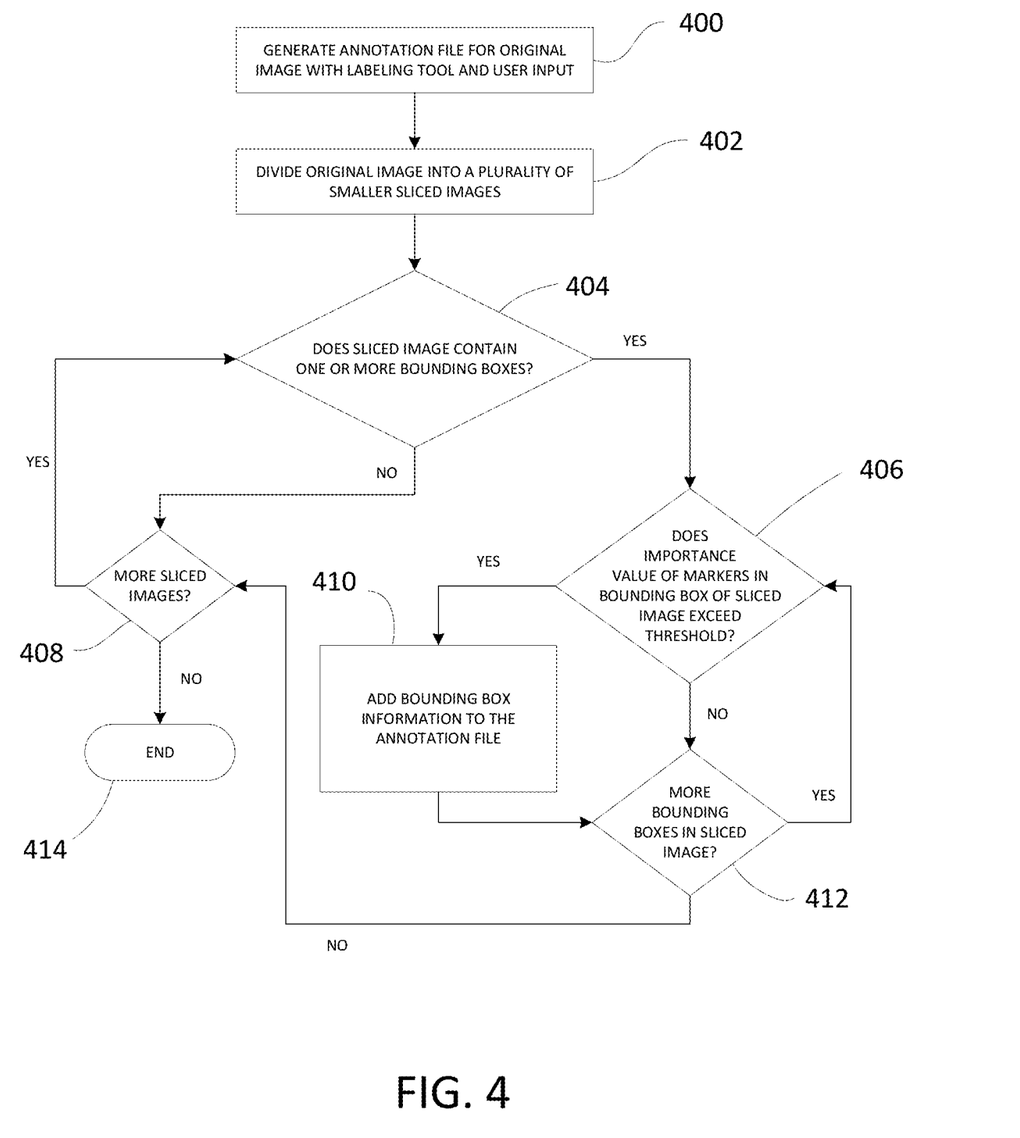
FIG. 4 is a block diagram of a method for generating training data for objects in an image using markers, according to embodiments.

Referring now to FIG. 4, this figure shows a method for generating training data for objects in an image using bounding boxes and markers, according to embodiments. In these embodiments, the image is sliced into a plurality of smaller images, and only a subset of the sliced images (and annotation information associated therewith) are used for training data.

In certain embodiments, in step 400, an annotation file is generated for the original image. In certain embodiments, a user has provided input through a labeling tool. The labeling tool enables the user to create bounding boxes for any objects in the image, and to create markers within the bounding boxes. In certain embodiments, the bounding box is an area of the image that encompasses the topmost, rightmost, leftmost and bottommost extremes of the object. Thus, the bounding box may have coordinates that identify the topmost and leftmost pixel position, as well as the bottommost and rightmost pixel position. Consequently, the bounding box also has a size in the horizontal direction, and a size in the vertical direction. In certain embodiments, a marker is a visual feature of an identified object that has been identified by a user with a labeling tool (e.g., a marker may be some feature that is sufficiently different from a background portion of an image). One identified object may have a plurality of markers, and these markers may be in different locations of the identified object. In certain embodiments, the marker is represented by an X-Y pixel coordinate within the image. In certain embodiments, the markers are designated with a numerical value that represents the relative importance of the marker relative to other markers. Thus, in step 400, the annotation file includes information regarding the bounding box of the object, and the markers for the object. In one example, the annotation information is saved as meta information in an Extensible Markup Language (XML) file, or another suitable file format that is known in the art. At this stage in the process, the entire original image has been processed to determine locations of any objects contained therein, and an XML file has been created that includes the meta information related to the markers and the bounding boxes that were designated by the user.

In step 402, in certain embodiments, the CPU (see, FIG. 1, 104) executes a slicing script that divides the original image into a plurality of smaller sliced images (e.g., partial image sections of the whole image). In certain examples, there may be hundreds or thousands of sliced images depending on the overall size/resolution of the image, and the size of the target objects designated therein. A given sliced image may or may not contain a bounding box (or a portion of a bounding box). In certain embodiments, if the sliced image does not contain a bounding box, it will also not contain any markers (e.g., all markers are contained within the boundaries of bounding boxes). On the contrary, if a sliced image does contain a bounding box (or portion thereof), it may or may not contain a marker. For example, a user may designate one marker for an object within a bounding box. However, if the slicing script divides the image into small enough image slices (e.g., where the object and respective bounding box is bigger than one, the bounding box may be split up into multiple sliced images. In this case, the one marker would invariably occur in only one of the multiple sliced images, and not in the others.

In step 404, in certain embodiments, the method includes analyzing each of the sliced images, and then determining whether there are any bounding boxes (or portions thereof) contained therein. If there is at least a portion of a bounding box in a sliced image, the process continues to step 406. If there are no bounding boxes in a sliced image, the process continues to step 408 to determine if there are any more sliced images to analyze.

In step 406, if it has been determined that the sliced image contains a bounding box, the method includes analyzing the sliced image to determine whether there are any markers present in the bounding box. In certain embodiments, if there is at least one marker in a particular sliced image, then in step 410 the method includes updating the annotation file to include annotation information for the sliced image (e.g., the bounding box information and the marker information). After the annotation file has been updated in step 410, the process continues to step 412 to determine whether there are any more bounding boxes in the sliced image. For example, one sliced image may contain multiple objects which have been previously marked with a bounding box.

In step 406, if it has been determined that there are no markers in the bounding box of the sliced image, the annotation file is not updated.

In other embodiments, more than one marker must exist in a given sliced image in order for the sliced image to be selected for training data (e.g., updating the annotation file).

In other embodiments, each marker has an importance value associated therewith. The importance value indicates the relative value (or importance) of the marker relative to other markers, or to some predetermined importance threshold value. In an embodiment where the markers have designated importance values, the annotation file is updated if there is at least one marker within the sliced image that meets a particular threshold level of importance. In another embodiment where there are multiple markers within a given sliced image, the annotation file is updated if the sum of the importance values of all the markers within the sliced image meets a particular threshold value.

In another embodiment, the annotation file is updated if at least one marker occurs in the sliced image, and if a center position of the bounding box of the object occurs within the sliced image.

Thus, according to certain of the present embodiments, only those sliced images with particular markers, or markers that meet certain marker criteria, will be used. Thus, not all of the sliced images will be used for training data. Accordingly, the overall number of annotations that need to be created for the sliced images is reduced, and the overall processing workload is reduced for training purposes. Moreover, by having annotations only for those sliced images where an object exists (e.g., excluding meaningless areas), there is an improvement in accuracy to the deep learning model that is generated based on the training data.

Referring again to FIG. 4, in step 412, if it is determined that there are more bounding boxes in the sliced image, the process returns to step 406 for further analysis of any markers contained within the next bounding box. In step 412, if it is determined that there are no more bounding boxes in the sliced image, the process continues to step 408 to determine if there are any more sliced images to analyze. Therefore, the marker analysis is repeated for each bounding box that occurs in the sliced image.

In step 408, if it has been determined that there are additional sliced images to analyze, the process returns to step 404. In step 408, if it has been determined that there are no additional sliced images to analyze, the process ends at step 414. After the process ends at step 414, the entire original image has been analyzed and the annotation file has been generated for every sliced image (e.g., where the markers meet the applicable marker criteria). At this stage, training can take place with a deep learning object detection model (e.g., utilizing the graphics processing unit (GPU) 170 shown in FIG. 1) using the training data (e.g., sliced images) and the generated annotation files.

Figure 5:
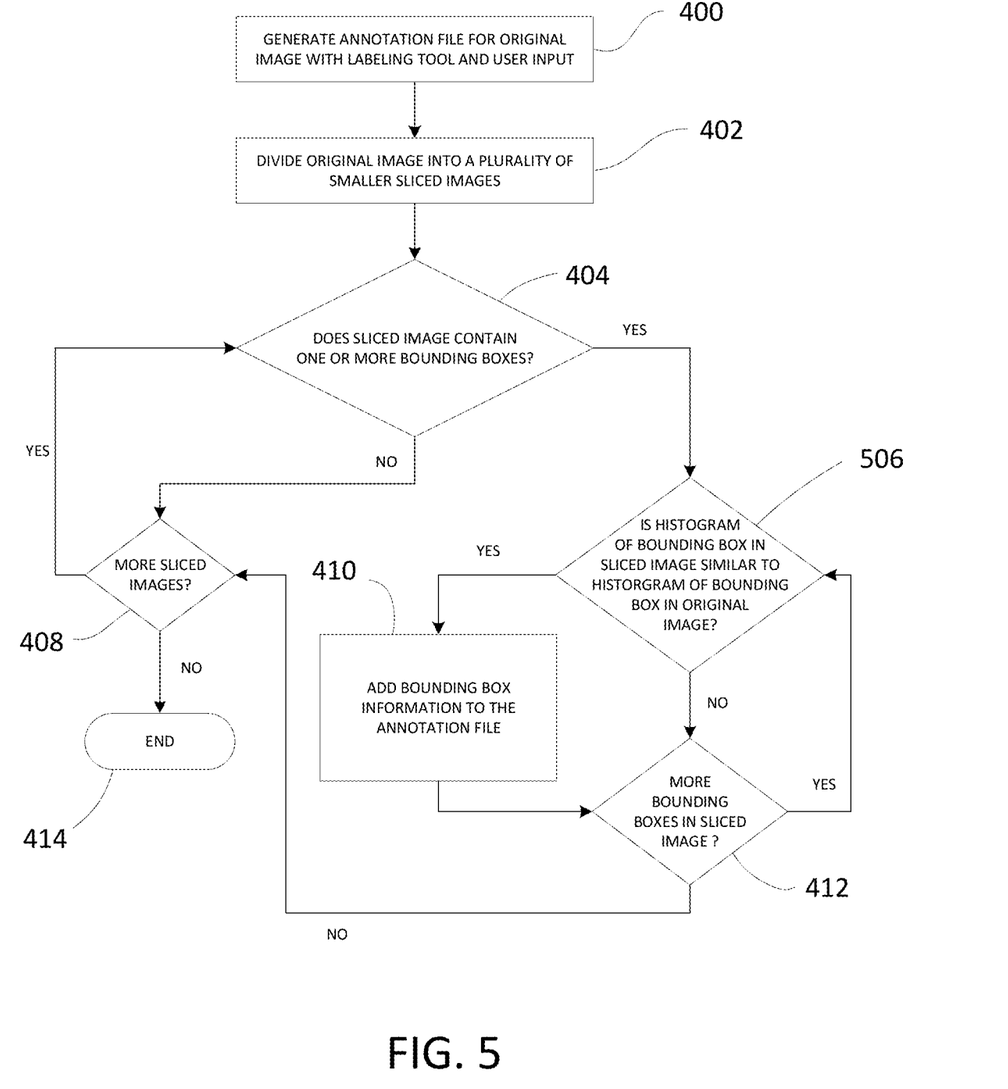
FIG. 5 is a block diagram of a method for generating training data for objects in an image utilizing comparisons of image histograms, according to embodiments.

Referring now to FIG. 5, this figure shows a method for generating training data for objects in an image using image histograms, according to certain embodiments. In these embodiments, the image is sliced into a plurality of smaller images, and only a subset of the sliced images (and annotation information associated therewith) are used for training data. In certain embodiments, steps 400, 402, 404, 408, 410, 412 and 414 are the same as those described above for FIG. 4. However, rather than utilizing markers to determine whether or not a sliced image is used for training data as in the process of FIG. 4, image histograms are used to determine whether the sliced image qualifies for training data. In step 506 of FIG. 5, the method includes comparing an image histogram of the original annotation area (e.g., at least a portion of the area of the image encompassed by the bounding box of the object) to an image histogram of the sliced annotation area (e.g., at least a portion of the area of the sliced image).

In general, an image histogram is a type of histogram that acts as a graphical representation of the tonal distribution in a digital image. In the image histogram, the number of pixels are plotted for each tonal value. By looking at the histogram for a specific image, a viewer will be able to judge the entire tonal distribution at a glance. In other embodiments, a histogram is generated based on a cumulative color value for all of the pixels in a row (or column) of pixels. Histograms can be based on greyscale pixel information from the image, or based on colored (e.g., RGB) pixel information. It should be appreciated that any other suitable method of generating an image histogram may be used provided that a comparison can be made between the bounding box image and the respective sliced image. More generally, it should be appreciated that any other suitable method of image comparison can be used (e.g., other than an image histogram method) provided that a comparison can be made between the bounding box image and the respective sliced image.

In step 506, if a similarity between both image histograms meets or exceeds a set threshold value, the method includes updating the annotation file to include annotation information for the sliced image (e.g., the bounding box information and/or the marker information). After the annotation file has been updated in step 410, the process continues to step 412 to determine whether there are any more bounding boxes in the sliced image. In step 506, if a similarity between both image histograms does not meet the threshold value, the annotation area is not selected for training data. As indicated above, the remaining steps in the method are the same as those described with respect to FIG. 4.

Figure 6:
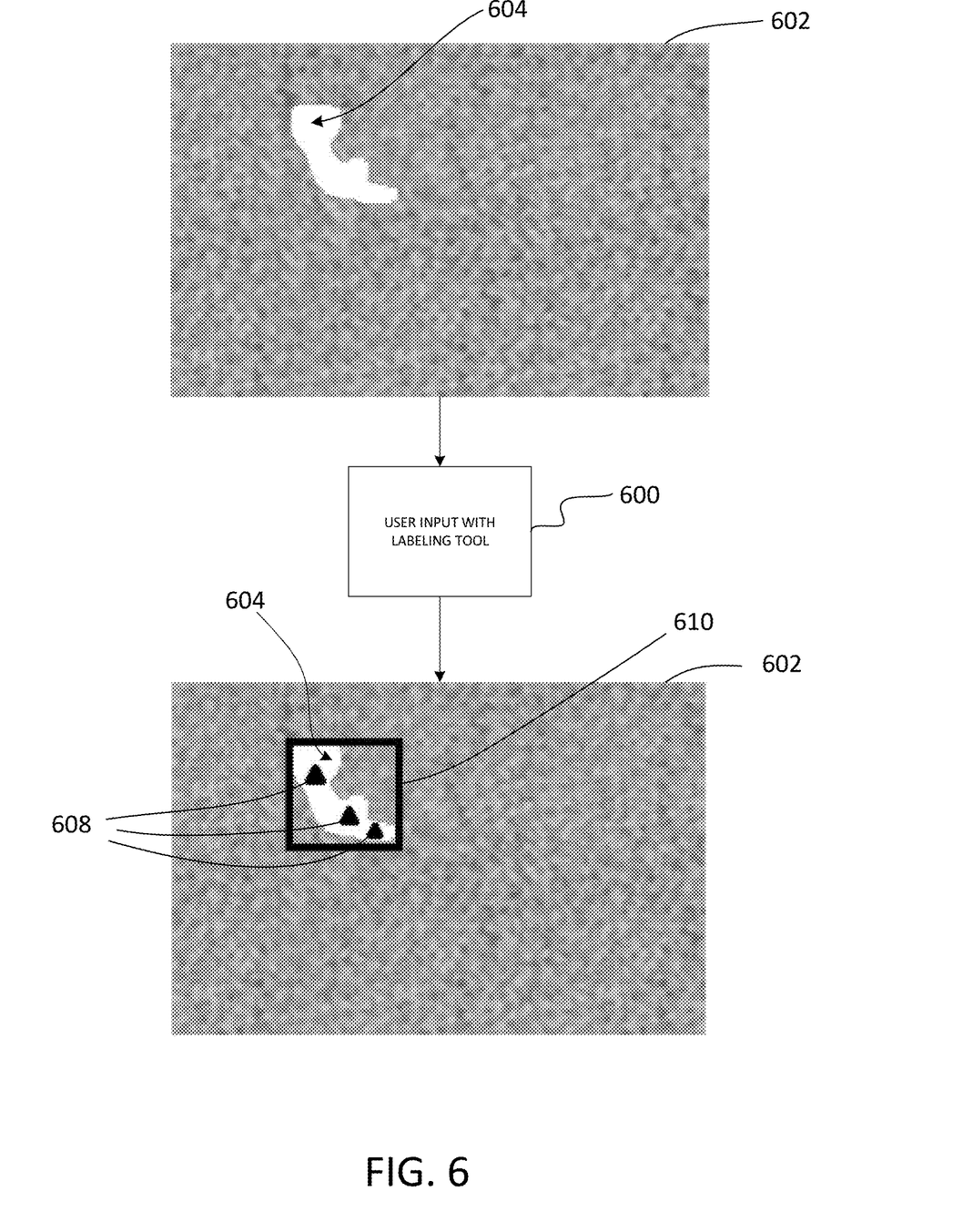
FIG. 6 illustrates a method of marking an object in an image using a labeling tool and user input, according to embodiments.

Referring now to FIG. 6, this figure shows an example of a user utilizing a labeling tool to generate a bounding box and markers for an object in the original image (e.g., pre-sliced). This figure is a graphical representation of step 400 that is shown and described above with respect to FIGS. 4 and 5. In the upper portion of FIG. 6, an original image 602 contains an object 604 (e.g., a nanometer or micrometer scale defect on an electronics device component) to be marked. In a general sense, the object can be any visual feature that has a certain threshold difference from a background of the image, and any feature that a user identifies as being abnormal. In the lower portion of FIG. 6, a bounding box 610 of the object 604 is determined. In certain embodiments, the bounding box 610 has coordinates that identify the topmost and leftmost position, as well as the bottommost and rightmost pixel position. Consequently, the bounding box 610 also has a size in the horizontal direction, and a size in the vertical direction, and this size is based on the size of the object 604 in the image 602. As also shown in the lower portion of FIG. 6, a plurality of markers 608 are generated that are associated with the object 604. It should be appreciated that a user may generate any suitable number of markers for a given object, depending on the size and/or the relevance of the object to the user.

In other embodiments, rather than a user manually identifying and marking objects (e.g., creating the bounding box and the markers) with a labelling tool, an automated optical inspection (AOI) system identifies the objects by using a camera to autonomously scan the device to obtain images, and then utilizes an image processing algorithm (or other suitable methods) to identify the objects or defects in the images.

Figure 7:
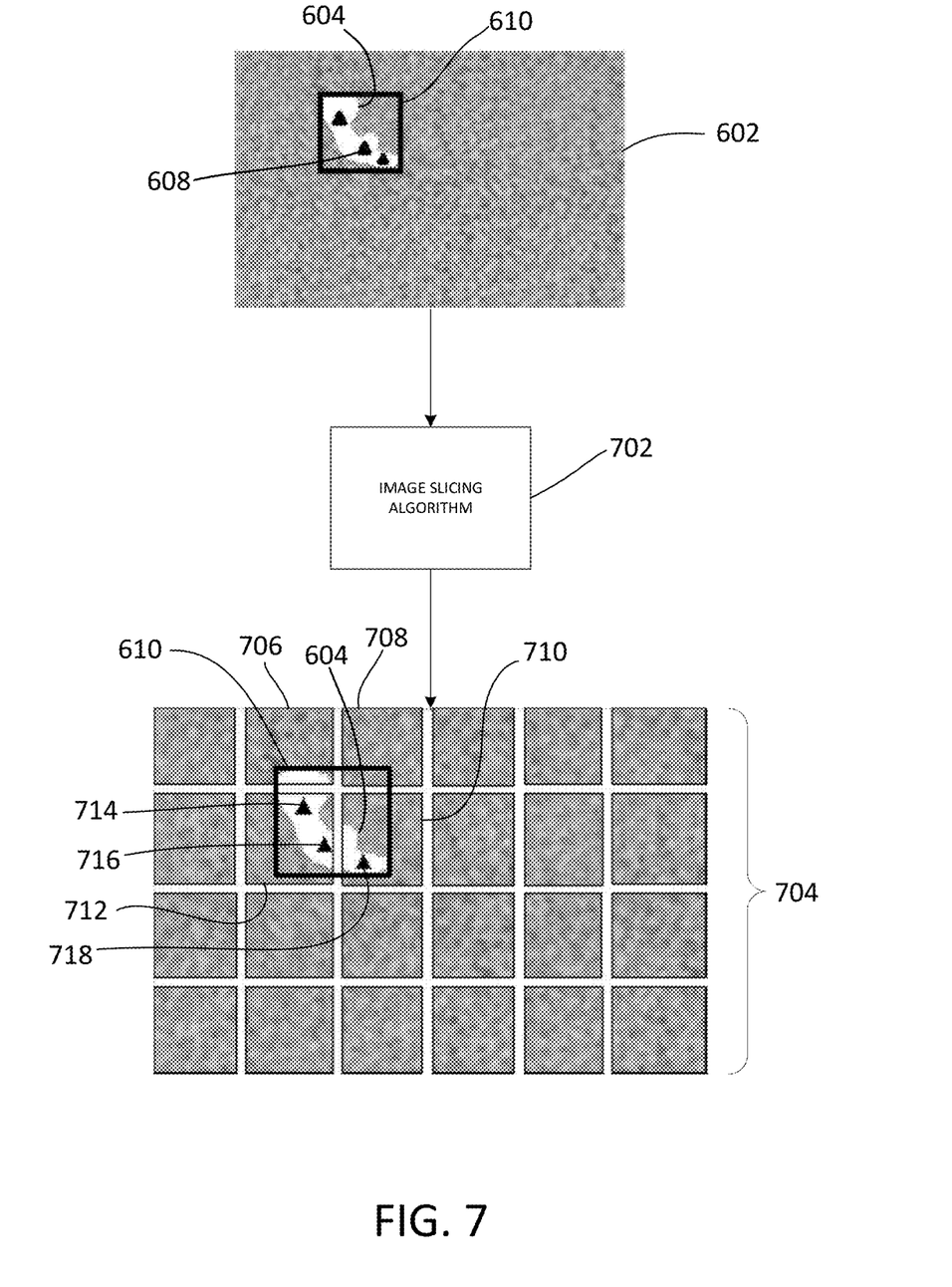
FIG. 7 illustrates a method of dividing an image into a plurality of sliced images using an image slicing algorithm, according to embodiments.

Referring now to FIG. 7, this figure shows an example of applying an image slicing algorithm to an original image to generate a plurality of sliced images. This figure is a graphical representation of step 406 shown and described above with respect to FIG. 4 and step 506 shown and described above with respect to FIG. 5. In the upper portion of FIG. 7, the bounding box 610 and markers 608 associated with the object 604 have been identified by the user with the labeling tool 600. The image slicing algorithm 702 slices the original image 602 into a plurality of sliced images 704 that are shown in the lower portion of FIG. 7. In this example, there are twenty four sliced images 704. However, it should be appreciated that there may be any suitable number of sliced images (e.g., hundreds or more). In certain embodiments, the number of sliced images is based on the size of the original image 602 and/or the sizes of the different objects that are detected in the image.

As shown in the lower portion of FIG. 7, the bounding box 610 of the object 604 occurs in four of the sliced images (e.g., sliced images 706, 708, 710 and 712). However, it should be appreciated that the bounding box 610 can occur in any number of sliced images, depending upon the size of the object 604. There are three markers 714, 716, and 718 that are associated with the object 604. In this example, two of the markers 714 and 716 occur in sliced image 712, and one of the markers 718 occurs in sliced image 710. In this example embodiment, if more than one marker occurs in any given sliced image, the annotation information associated with the sliced image is selected for training data. In certain embodiments, only the sliced images that coincide with the location of the bounding box (e.g., sliced images 706, 708, 710 and 712) are considered for possible training data. In this example, the object 604 occurs in sliced image 706. However, because sliced image 706 does not contain any markers, it will not be selected for training data. Also, in this example, the bounding box 610 occurs in sliced image 708. However, in sliced image 708, not only does the object not occur in this sliced image, but there are also no markers in this sliced image 708. As such, sliced image 708 will not be selected for training data. In this example, sliced image 712 contains two of the markers 714 and 716, and thus it will be selected for training data. Similarly, sliced image 710 includes one of the markers 718, and it will also be selected for training data. Accordingly, only two (e.g., sliced images 710 and 712) of the four sliced images (e.g., sliced images 706, 708, 710 and 712) are selected for training data. Accordingly, the number of annotations that need to be created for sliced image data is reduced, and the overall processing workload for training is reduced.

Figure 8:
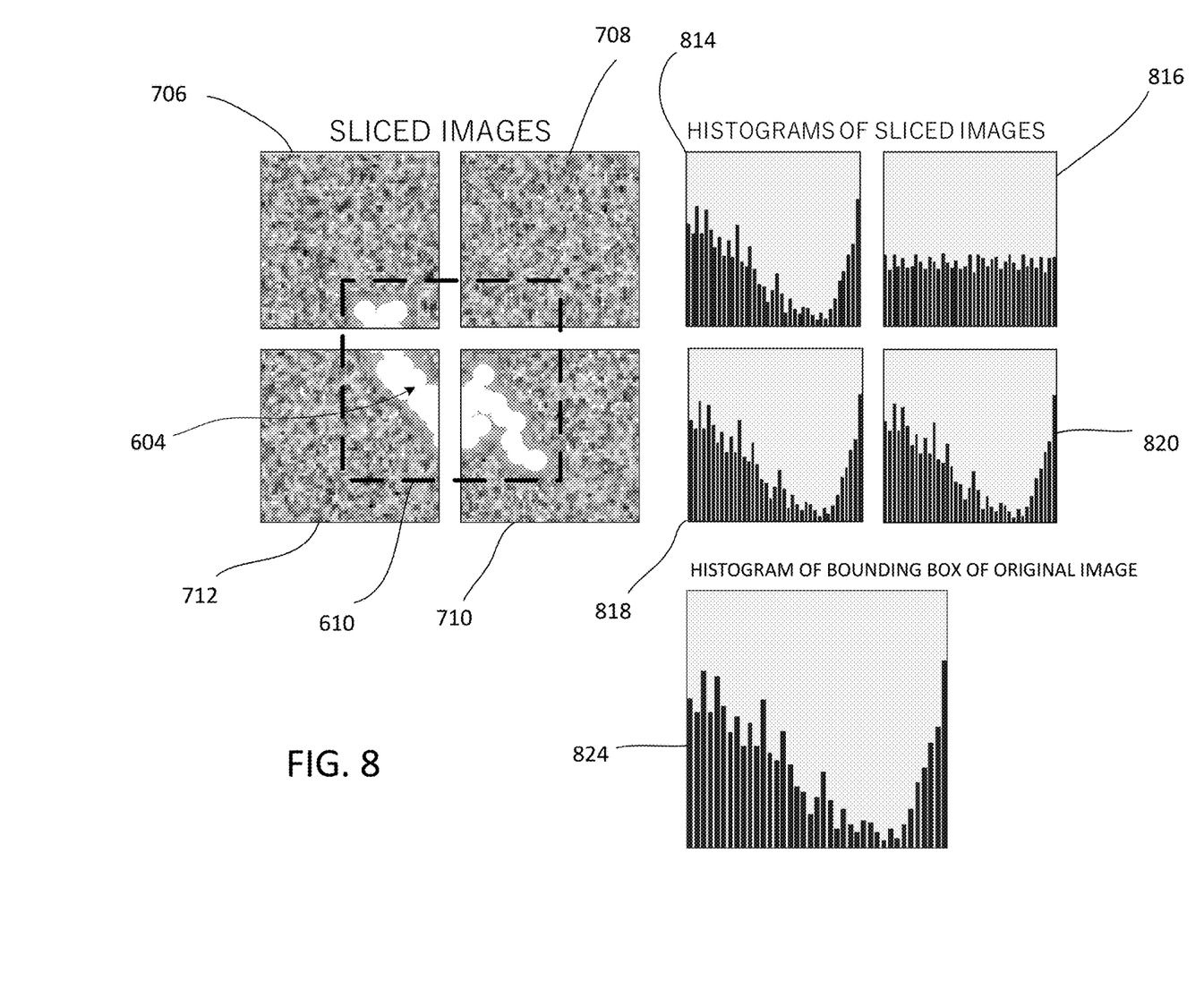
FIG. 8 illustrates a method of generating training data for small object detection utilizing image histogram comparisons, according to embodiments.

Referring now to FIG. 8, this figure shows an embodiment where image histogram comparisons are performed on the sliced images to determine whether they should be selected for training data. As shown in FIG. 8, the bounding box 610 of the object 604 occurs in four of the sliced images (e.g., sliced images 706, 708, 710 and 712). However, it should be appreciated that the bounding box 610 can occur in any number of sliced images, depending upon the size of the object 604 and the size/resolution of the sliced images. In this example embodiment, for each of the sliced images 706, 708, 710 and 712 an image histogram of the sliced image is generated. As shown in FIG. 8, sliced image histogram 814 corresponds to sliced image 706, sliced image histogram 816 corresponds to sliced image 708, sliced image histogram 818 corresponds to sliced image 712, and sliced image histogram 820 corresponds to sliced image 710. In this embodiment, a bounding box histogram 824 is also generated.

If the sliced image histogram has a similarity with the bounding box histogram beyond a certain threshold, the sliced image is selected for training data. In this example, the sliced image histograms 814, 818 and 820 of sliced images 706, 712 and 710 have a sufficient similarity with the bounding box histogram 824 and are therefore selected for training data. However, because the sliced image histogram 816 does not have a sufficient similarity with the bounding box histogram 824 (e.g., the shape of the histogram is relatively even), it will not be selected for training data. Accordingly, only three images (e.g., sliced images 706, 710 and 712) of the four sliced images (e.g., sliced images 706, 708, 710 and 712) are selected for training data. Accordingly, the number of annotations that need to be created for sliced image data is reduced, and the overall processing workload for training is reduced.

In certain embodiments, both histogram comparison and marker analysis are used in combination to determine whether a sliced image is to be used for training data. The order in which these analyses are performed can be changed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating training data for object detection, the method comprising:
dividing an image into a plurality of sliced images, the image including meta information for an object in the image, the meta information including
bounding box information associated with a bounding box surrounding the object, and
marker information for markers associated with the object, the markers being located within the bounding box;
designating at least one sliced object image from among the plurality of sliced images, at least a portion of the bounding box overlapping with each of the respective sliced object images;
designating at least one training data image from among the designated sliced object images based on the bounding box information and the marker information; and
generating the training data from the at least one designated training data image.

2. The method of claim 1, further comprising:
excluding from the training data, from among the plurality of sliced object images, all sliced object images that do not include a marker.

3. The method of claim 1,
wherein for each marker, the marker information includes a numerical value, and
wherein designating the at least one training data image requires that a cumulative numerical value for all of the markers in the respective sliced object image meets a threshold value.

4. The method according to claim 1, further comprising:
generating a bounding box image histogram for an area of the image corresponding to the bounding box; and
generating a sliced object image histogram for each of the sliced object images, wherein designating the at least one training data image requires that the bounding box image histogram meets a threshold level of correspondence with the sliced object image histogram for the respective sliced object image.

5. The method according to claim 1, further comprising:
generating an image histogram for an area of the image corresponding to the bounding box; and
generating an image histogram for each of the sliced object images;
wherein for each marker, the marker information includes a numerical value,
wherein designating the at least one training data image requires that a cumulative numerical value for all of the markers in the respective sliced object image meets a threshold value, and
wherein designating the at least one training data image requires that the image histogram for the bounding box meets a threshold level of correspondence with the image histogram for the respective sliced object image.

6. The method according to claim 1, wherein generating the training data includes generating annotation information for each of the training data images.

7. The method according to claim 1, wherein the bounding box corresponds to a maximum width and a maximum height of the object.

8. A computer system comprising:
one or more computer readable storage media with program instructions collectively stored on the one or more computer readable storage media; and
one or more processors configured to execute the program instructions to perform a method for generating training data for object detection, the method comprising:
dividing an image into a plurality of sliced images, the image including meta information for an object in the image, the meta information including
bounding box information associated with a bounding box surrounding the object, and
marker information for markers associated with the object, the markers being located within the bounding box;
designating at least one sliced object image from among the plurality of sliced images, at least a portion of the bounding box overlapping with each of the respective sliced object images;
designating at least one training data image from among the designated sliced object images based on the bounding box information and the marker information; and
generating the training data from the at least one designated training data image.

9. The computer system of claim 8, further comprising:
excluding from the training data, from among the plurality of sliced object images, all sliced object images that do not include a marker.

10. The computer system of claim 8,
wherein for each marker, the marker information includes a numerical value, and
wherein designating the at least one training data image requires that a cumulative numerical value for all of the markers in the respective sliced object image meets a threshold value.

11. The computer system according to claim 8, the method further comprising:
generating a bounding box image histogram for an area of the image corresponding to the bounding box; and
generating a sliced object image histogram for each of the sliced object images,
wherein designating the at least one training data image requires that the bounding box image histogram meets a threshold level of correspondence with the slice object image histogram for the respective sliced object image.

12. The computer system according to claim 8, the method further comprising:
generating an image histogram for an area of the image corresponding to the bounding box; and
generating an image histogram for each of the sliced object images;
wherein for each marker, the marker information includes a numerical value,
wherein designating the at least one training data image requires that a cumulative numerical value for all of the markers in the respective sliced object image meets a threshold value, and
wherein designating the at least one training data image requires that the image histogram for the bounding box meets a threshold level of correspondence with the image histogram for the respective sliced object image.

13. The computer system according to claim 8, wherein generating the training data includes generating annotation information for each of the training data images.

14. The computer system according to claim 8, wherein the bounding box corresponds to a maximum width and a maximum height of the object.

15. A computer program product for generating training data for object detection, the computer program product comprising:
one or more computer readable storage media, and program instructions collectively stored on the one or more computer readable storage media, the program instructions comprising:
program instructions to divide an image into a plurality of sliced images, the image including meta information for an object in the image, the meta information including
bounding box information associated with a bounding box surrounding the object, and
marker information for markers associated with the object, the markers being located within the bounding box;
program instructions to designate at least one sliced object image from among the plurality of sliced images, at least a portion of the bounding box overlapping with each of the respective sliced object images;
program instructions to designate at least one training data image from among the designated sliced object images based on the bounding box information and the marker information; and
program instructions to generate the training data from the at least one designated training data image.

16. The computer program product of claim 15, further comprising:
program instructions to exclude from the training data, from among the plurality of sliced object images, all sliced object images that do not include a marker.

17. The computer program product of claim 15,
wherein for each marker, the marker information includes a numerical value, and
wherein designating the at least one training data image requires that a cumulative numerical value for all of the markers in the respective sliced object image meets a threshold value.

18. The computer program product according to claim 15, further comprising:
- program instructions to generate a bounding box image histogram for an area of the image corresponding to the bounding box; and
- program instructions to generate a sliced object image histogram for each of the sliced object images,
- wherein designating the at least one training data image requires that the bounding box image histogram meets a threshold level of correspondence with the sliced object image histogram for the respective sliced object image.

19. The computer program product according to claim 15, further comprising:
- program instructions to generate an image histogram for an area of the image corresponding to the bounding box; and
- program instructions to generate an image histogram for each of the sliced object images;
- wherein for each marker, the marker information includes a numerical value,
- wherein designating the at least one training data image requires that a cumulative numerical value for all of the markers in the respective sliced object image meets a threshold value, and
- wherein designating the at least one training data image requires that the image histogram for the bounding box meets a threshold level of correspondence with the image histogram for the respective sliced object image.

20. The computer program product according to claim 15, wherein generating the training data includes generating annotation information for each of the training data images.

* * * * *